US005128879A

United States Patent [19]

Greve et al.

[11] Patent Number: 5,128,879

[45] Date of Patent: Jul. 7, 1992

[54] METHOD AND APPARATUS FOR ACQUIRING COVERING DATA OF PRINT AREAS

[75] Inventors: Helmut Greve, Neumuenster; Eckhard Lindemann, Raisdorf; Claus Schmidt-Stoelting, Heikendorf, all of Fed. Rep. of Germany

[73] Assignee: Dr. Ing. Rudolf Hell GmbH, Fed. Rep. of Germany

[21] Appl. No.: 566,371

[22] PCT Filed: Feb. 16, 1989

[86] PCT No.: PCT/DE89/00088

§ 371 Date: Aug. 17, 1990

§ 102(e) Date: Aug. 17, 1990

[87] PCT Pub. No.: WO89/07525

PCT Pub. Date: Aug. 24, 1989

[30] Foreign Application Priority Data

Feb. 17, 1988 [DE] Fed. Rep. of Germany ....... 3804941

[51] Int. Cl.[5] .......... G01J 3/46

[52] U.S. Cl. .......... 364/526; 101/211

[58] Field of Search .......... 356/380, 402, 444; 250/559; 364/526; 382/55; 101/211

[56] References Cited

U.S. PATENT DOCUMENTS 4,180,741 12/1979 Palmatier et al. .............. 250/559 X
4,441,819 4/1984 Takeuchi et al. .............. 356/380
4,494,875 1/1985 Schramm et al. .............. 356/402
4,512,662 4/1985 Tobias .............. 356/380
4,573,798 3/1986 Fujie et al. .............. 356/432
4,660,159 4/1987 Ott .............. 364/526
4,665,496 5/1987 Ott .............. 364/526

*Primary Examiner*—Parshotam S. Lall
*Assistant Examiner*—S. A. Melnick
*Attorney, Agent, or Firm*—Hill, Van Santen, Steadman & Simpson

[57] ABSTRACT

In the line-by-line recording of films (15') for producing offset printing forms or in the line-by-line exposure of offset printing plates from recording data, i.e. density values of a line, the setting values for the individual zone screws are directly calculated from the density values and are stored or, respectively, directly forwarded to the printing machine (80). Before the forwarding of the setting values to the printing machine (80), density values are advantageously converted into the setting values with masks that, with reference to printing areas, printing surface in the pages (50) and with reference to the register system of the printing machine (80) as well as with reference to the characteristic data of a page (50), contain the allocation of the setting values of the zone screws calculated from the density values of the page (50). These masks can preferably be produced with a PC (60); the setting values can be intermediately stored or can be directly forwarded via an interface to the zone control (70) of the printing machine (80).

7 Claims, 4 Drawing Sheets

METHOD AND APPARATUS FOR ACQUIRING COVERING DATA OF PRINT AREAS

Figure 1:
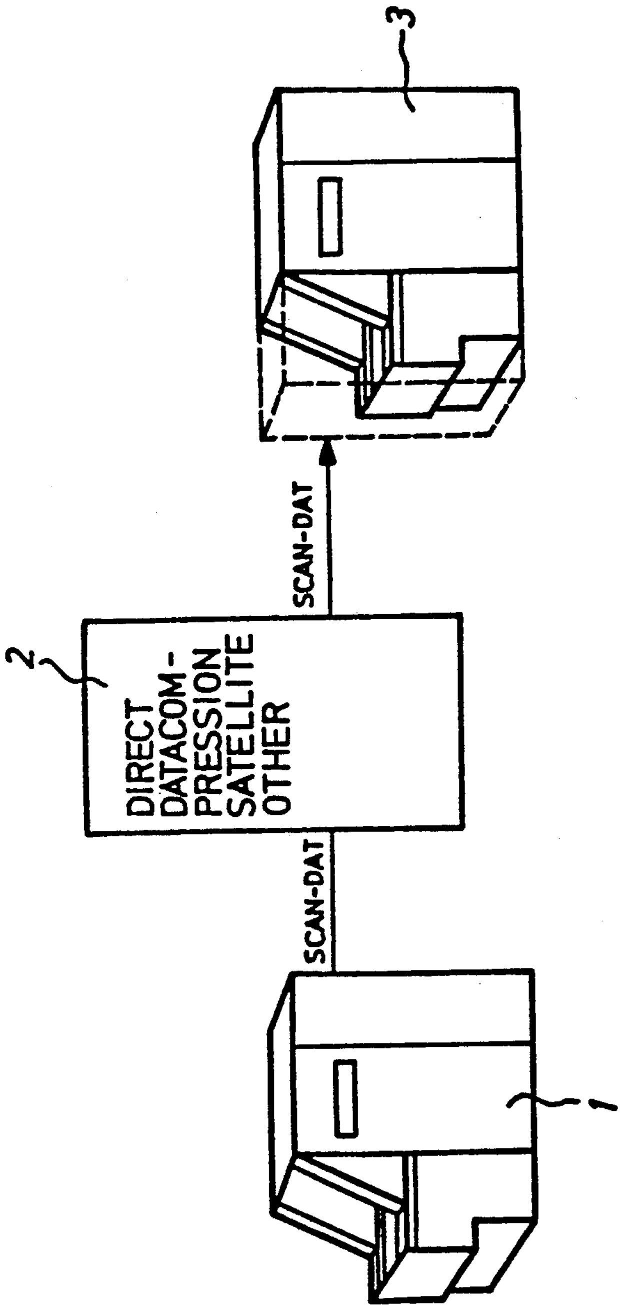

The invention is directed to a method and to an apparatus for acquiring covering data of print areas for controlling what are referred to as color zone screws at offset printing presses.

The quantity of ink delivered to the individual printing cylinders that are in turn subdivided into zones can be set at offset printing presses on the basis of what are referred to as color zone control screws (zone screws).

In currently standard methods, the partial area coverage of a printing page is estimated, the zone screws of the color values are correspondingly pre-set and the zone screws are regulated to the correct ink quantity during the beginning of printing by alternating adjustment and repeated evaluation of the printed pages. In modern offset printing presses, this ink delivery can be automatically controlled from a central reservoir in accord with a program. To that end, coverage values that were calculated before the beginning of printing can also be input. These data are then calculated by rough scanning of exposed film negatives with what are referred to as color density measuring instrument, for example, Printamat-Scanner of Siemens, and are conducted to the control system via an interface.

A separate scanning of the exposed film negatives is required in this method, this producing a separate work step, i.e. an additional scanning device is required and a relatively imprecise calculation of the setting data is established by the type of rough scanning.

It is therefore the object of the invention to acquire the setting data for the zone screws simpler and more precisely and to offer them for the printing machine.

In the line-by-line recording of films for producing offset printing forms or in the line-by-line exposure of offset printing plates, the invention achieves this in that the setting values for the individual zone screws are directly calculated from the density values from the recording data, i.e. the density values of the line, and are stored or, respectively, are forwarded directly to the printing machine. Before the forwarding of the setting values to the printing machine, density values are advantageously converted into the setting values with masks that, with reference to printing area, printing surface in the pages and with reference to the register of the printing machine as well as with reference to the characteristic data of a page, contain the allocation of the setting values of the zone screws calculated from the density values in the page. These masks can preferably be produced with a personal computer, the setting values can be intermediately stored or can be directly forwarded to the zone controller of the printing machine via an interface. Further developments of the invention are recited in patent claims 1-7.

The method of the invention is advantageously employed in, for example, what are referred to as pressfax equipment wherein a newspaper page or color separations are scanned with flatbed scanners, are transmitted to some other location and are recorded line-by-line with flatbed recorders as film, offset or as color separations. Such equipment are described, for example, in the brochure, "Pressfaxsystem-Uebertragung von Druckvorlagen, of Dr.-Ing. Rudolf Hell GmbH, Kiel, Germany, Order No. 28294 (2d-H-8802).

Figure 2:
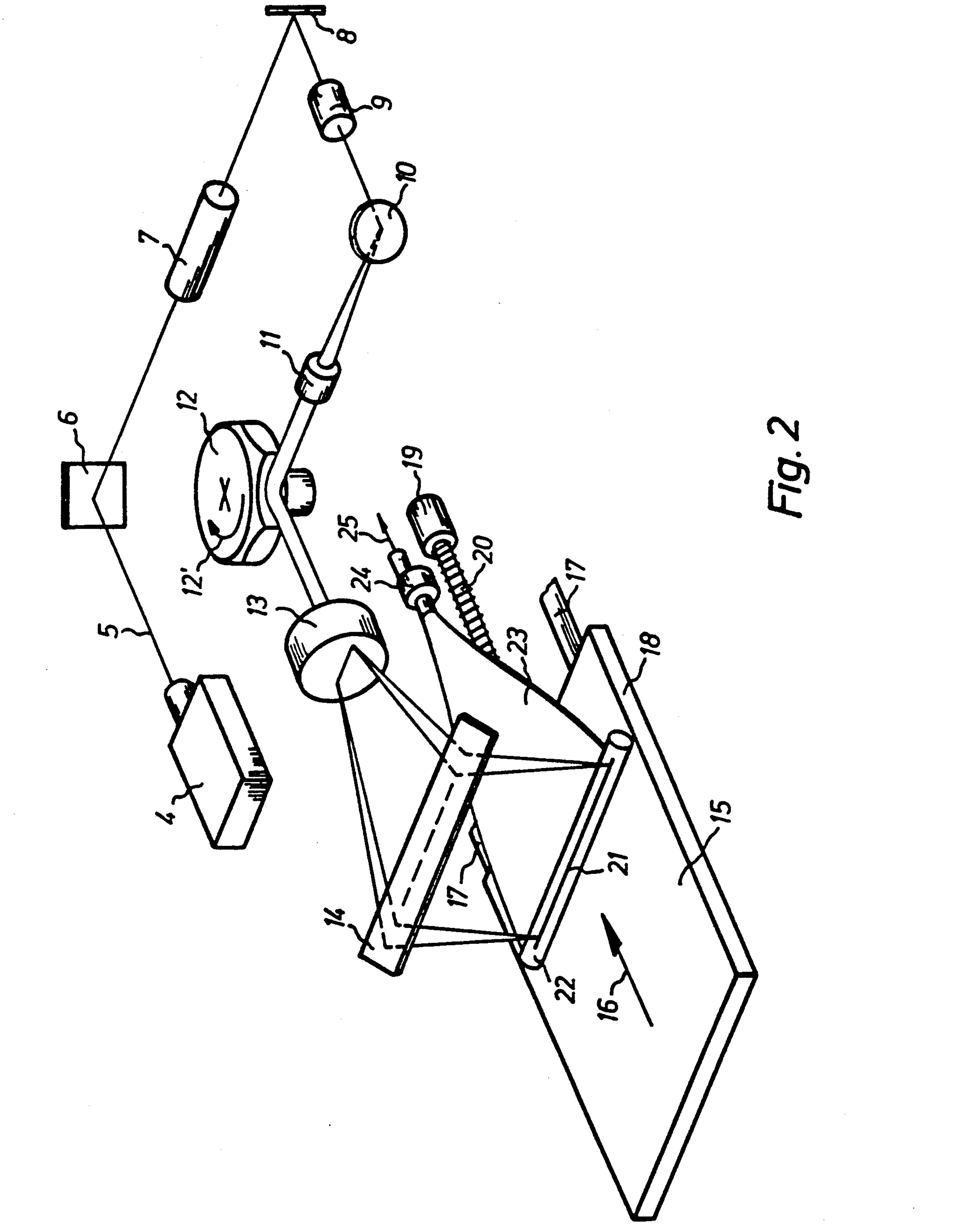
Figure 3:
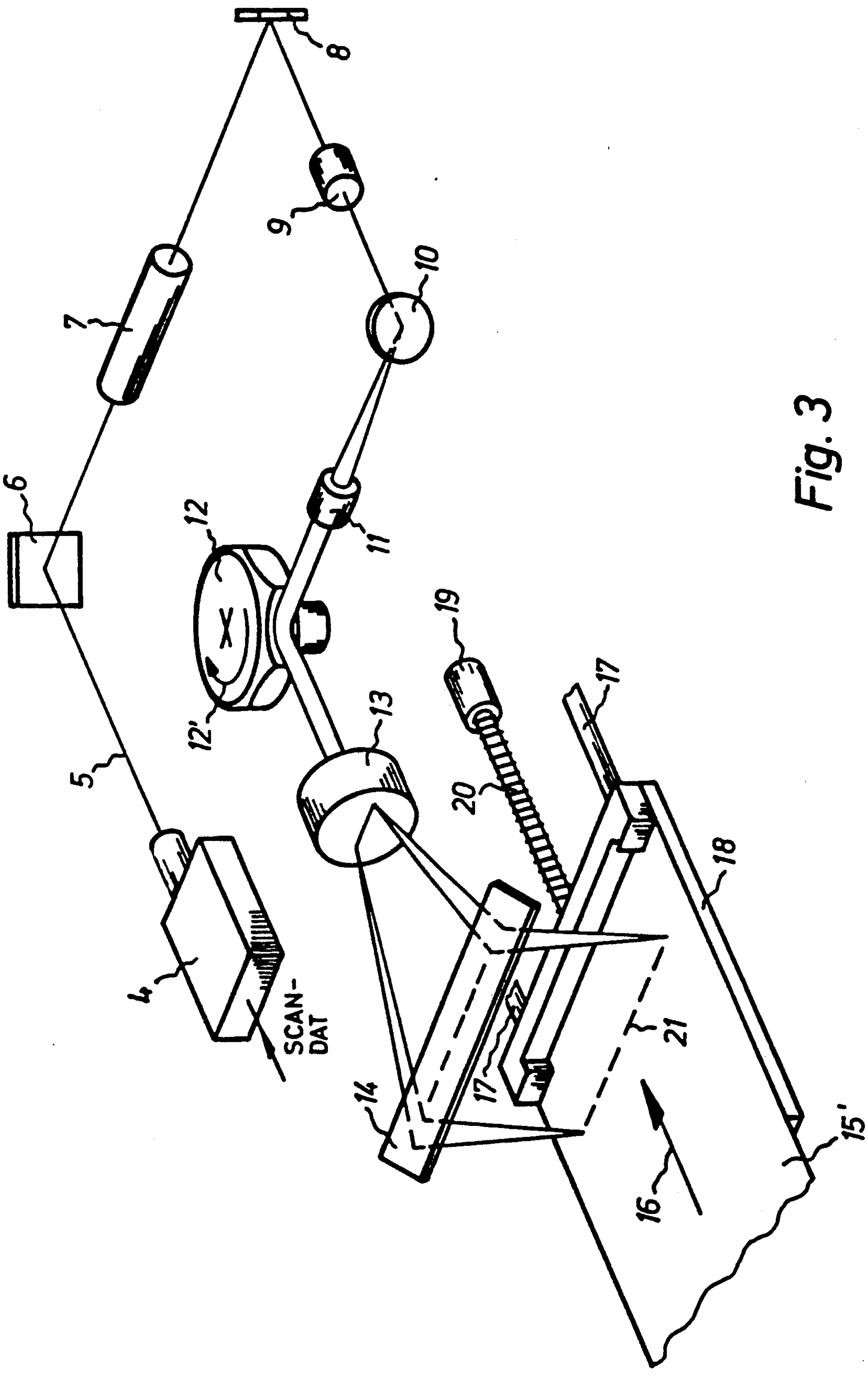
Figure 6:
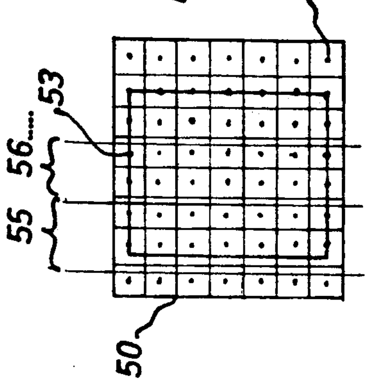
Figure 5:
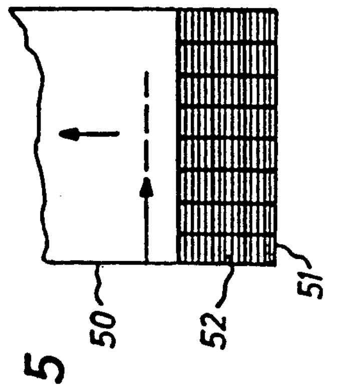
Figure 4:
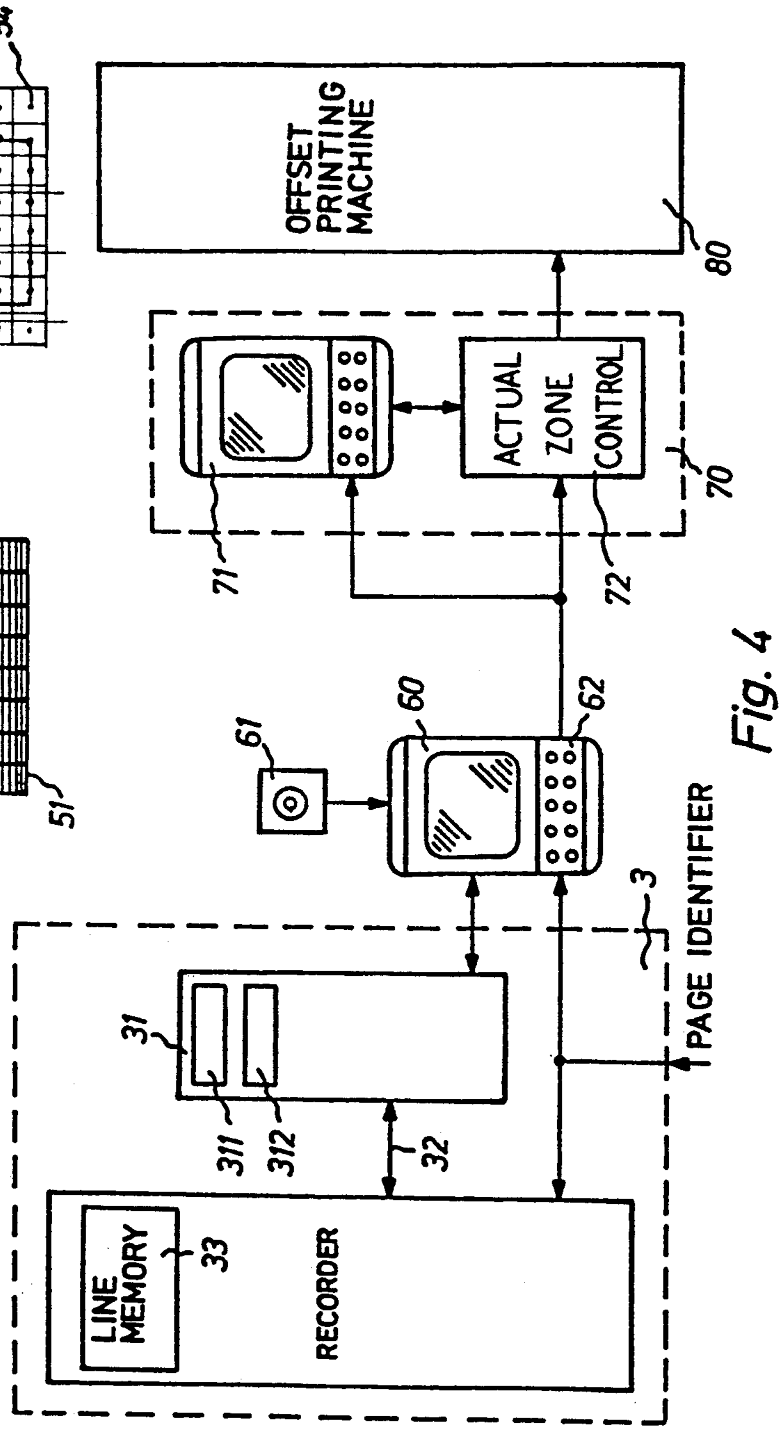

The invention shall be set forth in greater detail below with reference to FIGS. 1-6. Shown are:

FIG. 1 a schematic diagram of a system for the transmission of printer's copies;

FIG. 2 a schematic structure of a flatbed scanner;

FIG. 3 a schematic structure of a flatbed recorder;

FIG. 4 a means for acquiring covering data of printing areas in combination with a printing machine;

FIG. 5 a schematic illustration of the dissection of a printed page into line segments; and FIG. 6 a graphic illustration of the masks for the printing area and for the zones.

FIG. 1 shows a system for the transmission of complete newspaper pages from one location (transmission location) to another (reception location), whereby what are referred to as scan data are acquired with a scanner 1 that serves the purpose of scanning the originals to be transmitted, are transmitted via a transmission link 2 to a recorder 3 connected to the transmission link at the receiving location and are recorded there by the recorder 3. The transmission can ensue directly via lines, with data compression, via broadcasting, satellite or other transmission links. For example, what are referred to as pressfax equipment can be utilized, wherein a newspaper page or color separations are scanned with a flatbed scanner at the transmitting location, are transmitted to the receiving location, and are recorded there with a flatbed recorder line-by-line as film, offset plate or a color separation, as described in the afore-mentioned brochure.

FIG. 2 shows a flatbed scanner of such a system comprising a laser light source 4 whose beam 5 proceeds onto a beam expander 11 via a mirror 6, an optics 7, a further mirror 8 as well as a further optics 9 and a further mirror 10, the exit beam of this beam expander being deflected onto a scanner lens (F-theta lens) 13 via a mirrored polygonal wheel rotating in arrow direction 12. The multiple beam deflection with the mirrors 6, 8 and 10 effects a relatively small three-dimensional fashioning of the optical system.

The beam deflected by the polygonal mirror 12 is steered via a mirror 14 onto the original 15 to be scanned, this original being arranged on the table 18 displaceable on guides 17 in arrow direction 16. The table is driven by a motor 19 via a spindle 20. The light beam moves line-by-line along the line 21 and the light reflected by the original is supplied to a light pick-up 22 and light conductor 23 to a photoelectric transducer 24 at whose output the electrical scan signal is adjacent at a line 25, this, as what is referred to as scan data, being transmitted to the recorder. Such light pick-ups, for example are disclosed in EP B 1 0064736. In an analogous fashion, FIG. 3 shows the recorder at the reception side, this having fundamentally the same optical structure as the scanner in FIG. 2. The same reference numerals are employed in FIG. 3 for this reason and that stated about the beam guidance with respect to FIG. 2 is also valid. The laser 3, however, does not emit a constant light, but is modulated with the transmitted scan data or it emits a constant light beam and a separate modulator (not shown) is provided in the beam path in order to modulate the light dependent on the scan data. The modulated light beam moves along the line 21 across the film 15' that is forwarded in arrow direction 16 by the table 18.

The recorder 3 comprises a control 31 that is connected via a bidirectional data line 32 to the recorder and via a further controller 104 to a PC 60 that comprises a software control 61 and a control panel 62. The hardware control of the recorder 3 comprises a memory 311 and a processor 312 with which the recording data of a page or, respectively, of a color separation are called in from the line memory 33 of the recorder 3 and are converted into the corresponding density values for the zone control. This conversion ensues such that the line is dissected into individual segments and, with corresponding line segments of the following lines, are evaluated with respect to the density values of the individual pixels contained in these segments. A mean density value thus derives that is representative of these combined line segments and is stored. These values are forwarded to the PC 60 and they are converted with the masks which are set forth above into the actual zone setting data that are forwarded either via intermediate memories or via an interface (not shown in the drawing) to the zone control 70 of the printing machine that is composed of a control system 71 and of the actual zone control 72. The zone control then undertakes the setting of the zone screws in the offset printing press 80 dependent on the density values calculated from the recording data.

On the basis of this inventive way of evaluating the recording signals in the recorder, a pattern of density values is thus generated for an entire newspaper page, this then being achieved with the assistance of masks whereof one reproduces the printing area and the other reproduces the position of the zone screws with respect to the printing area and, thus, an exact allocation of the density values to the zone screws. These masks also take into consideration the register of the printing machine with reference to the printing area. Moreover, the identifiers of the individual, transmitted pages can be co-logged and acquired by the PC 60, exactly allocated to the zone screw setting data and forwarded.

FIG. 5 schematically shows a transmitted page 50 from whose recording data for each segment 51 or, respectively, field 52 that derives from a plurality of lines a mean density value is calculated. Since the transmission from transmitter to receiver is line-sequential and the recorder 3 comprises a plurality of line memories 33, the pixel data of a field can also be called in with the assistance of the processor 312 and a respective mean density value per field can be calculated. These are then stored in the memory 311 and are evaluated with the PC 60.

The invention was set forth above with reference to the example of the pressfax system. However, the employment thereof in electronic image processing or setting systems also lies within the framework of the invention, everywhere in reproduction or, respectively, printing technology where image data that serve the purpose of manufacturing offset printing forms arise pixel-by-pixel in line fashion or are digitally stored as what are referred to as pixels (picture elements).

As already mentioned and shown in FIG. 5, the individual lines are dissected into segments 51 for the acquisition of the data for the zone control 70, the length of these segments being shorter than the width of the zones of the color unit. (When transmitting newspaper pages, for example, work is carried out with 50 lines/mm, this corresponding to a line spacing of 20 $\mu$m.) Standard values for the number of zones in printer units are, for example, 40 zone screws per printing cylinder, this yielding ten zone screws, i.e. zones per plate when eight printing plates are mounted (respectively two in circumferential direction). Dependent on the printing area, for example, 8-10 zones thus devolve onto a printed page. The segment length can be advantageously selected such that approximately eight segments fall onto a zone. The fields 52 of FIG. 5 can thereby be selected to be quadratic or rectangular in the longitudinal direction of the zones. When the segment length is reduced, then the precision becomes greater. Values between eight and fifteen fields per zone are meaningful. In the example of FIG. 4, the calculation of the mean values of the fields 52 of FIG. 5 ensues with the processor 312 and with the memory 311. The lines incoming in the recorder proceed into the line memory 33 and, from there, via the line 32 into the memory 311 where the entire transmitted page 50 of FIG. 5 is stored. With a given segment length and field width (the fields are preferably quadratically selected), the processor 312 calculates a mean value per field from the stored picture elements (pixels) by adding up the density values of the pixels lying in the field. These mean density values are then stored as a rough image, i.e. an image of rough lines arises having a coarser line raster and picture element spacing corresponding to the center of the fields 52 of FIG. 5. These rough image data are then transmitted into the memory of the PC 60 with a page identifier.

Any standard PC can be utilized as PC 60 in the practical calculation of the zone screw setting values, for example an IBM-PC with the operating system MS DOS upon employment of the program language of Turbo C. The following steps are carried at the PC and any person skilled in the art familiar with a PC can implement this without further ado given knowledge of these steps.

The first mask corresponding to the entire printing area of the page to be printed is produced at the PC and is placed over the stored rough lines, this defining the exact printing area in the transmitted page with reference to the register of the printing plate. In a calculating event, the mean density values of the fields that fall in the printing area are utilized for calculating the zone screw setting values in that a second mask is placed over the stored rough lines with the PC, this second mask reflecting the width and the relative position of the zones of the printer unit with reference to the printing area. The mean, percentage density value that takes into consideration that percentage area proportion of the respective field that lies in the zone is then calculated for every rough line and zone of the second mask, being calculated from the mean densities of the fields of each and every rough line that falls entirely or partially into the first mask. An overall mean value per zone is then calculated and stored for every zone from all density values of the first calculating step that fall into the zone. In detail, these procedures are executed as follows:

After the first mask was placed over the rough image stored in the PC 60, the rough picture elements of the transmitted image which fall into the mask, i.e. the actual printing area, have been been defined.

Only these rough picture elements are utilized for the further calculation. For the sake of simplification, let it be assumed in FIG. 5 that the format of the first mask, i.e. of the printing area, is congruent with the format of the transmitted page 50 of FIG. 5, so that all fields 52 of FIG. 5 fall into the mask, i.e. the mask coincides with the boundary of the transmitted page 50 that is shown in FIG. 5.

The case can frequently occur in practice, however, that the printing area is smaller than the transmitted page 50, so that individual fields are cut. This is shown in FIG. 6. The mask 53 comprises only a part of the rough picture elements 54, i.e. of the mean density values of the fields 52. For simplification, only two zones 55 and 56 are shown in FIG. 6 and the plurality of fields 52 per zone is likewise selected lower for simplification. For calculating the overall mean density value of a zone, only the fields that lie within the individual zones are taken into consideration, but only with that proportion thereof with which they lie within the printing area, i.e. the mask 53. This means that the mean density values of the fields that lie entirely in the mask 53 enter fully into the calculation and the mean values of the acquired fields cut by the mask 53 enter into the calculation only with a percentage proportion that corresponds to the area covered by the mask.

We claim:

1. The method for acquiring surface coverage data of printing forms for printing machines having color zone control zone screws for partial metering of the ink quantities of the printer unit during printing dependent on the image content of printer copies, whereby the partial area coverages of a printed page are calculated before the printing and are used for setting the zone screws with a zone control that influences the zone screws comprising the steps of: scanning the master copy pixel-by-pixel and line-by-line for acquiring recording data in the form of density values; producing masks which contain the allocations of density values to the individual zones of the printing surfaces of the printed pages, to a register system of the printing machine and to the characteristic data of the printed pages; calculating percentage density values as setting values for the individual zone screws in the pixel-by-pixel and line-by-line recording of films for producing offset printing forms or in the direct recording of offset printing plates, and said calculating done with the masks directly from the density values acquired by scanning the master or from modified density values; and storing the calculated percentage density values for a later employment or forwarding them directly to the printing machine for setting the zone screws, and comprising the additional steps of: storing the density values acquired by scanning the master line-by-line; subdividing the lines into individual segments whose respective lengths are shorter than the width of a zone of the printer unit; combining a plurality of segments of a plurality of lines lying side-by-side into fields; calculating a mean density value for every field from the stored density values of the appertaining fields; storing the calculated, mean density values of the individual fields in a rougher line grid as rough lines; and calculating the percentage density values as setting values for the additional zone scews from the stored, mean density values of the rough lines which are utilized as modified density values.

2. The method according to claim 1, comprising the additional steps of:

first producing a first mask corresponding to the entire printing area of a printed page, this first mask defining the exact printing area in the printed page with reference to the register system of the printing machine;

producing a second mask that reproduces the width and relative position of the individual zones of the printer unit with reference to the printing area of the printed page;

placing said first and second mask over a line;

selecting for calculating the percentage density values the density values of those picture elements that fall entirely or partially into the printing area defined by a first mask;

calculating in a first calculating step, a mean percentage density value that considers the percentage area portion of the respective picture element that lies in the zone from the selected density values of the picture elements of each and every line, and calculating for every picture element of the line and for every zone of the second mask; and calculating in a second calculating step, a mean percentage overall density value per zone the setting value for the zone screws for every zone from all percentage density values that fall into the appertaining zone.

3. The method according to claim 1, comprising the additional steps of:

producing a first mask corresponding to the overall printing area of a printed page said first mask defining the exact printing area in the printed page with reference to the register system of the printing machine;

producing a second mask that reproduces the width and relative position of the individual zones of the printing unit with reference to the printing area of the printed page;

placing said first and second mask over the stored rough lines;

selecting and calculating in a first calculating step the mean density values of those fields that fall entirely or partially into the printing area defined by the first mask and calculating the percentage density values; selecting and calculating in a first calculating step the mean percentage density value by considering the percentage surface portion of the respective field that lies in the zone which is calculated from the selected mean density values of the fields of each and every rough line, and said calculations being made for every field of the rough line and for every zone of the second mask; and calculating in a second calculating step, a mean percentage overall density value per zone which is calculated as a setting value for the zone screws, and said calculations being made for every zone from all percentage density values that fall into the appertaining zone.

4. The method according claims 1 or 2 or 3 comprising the steps of:

acquiring by scanning the density values of the printed page and transmitting the master pixel-by-pixel and line-by-line from a transmission location to a reception location and recording said values at the receiving location; and calculating the percentage density values from the transmitted density values at the receiving location directly during the recording.

5. The method according to claims 1 or 2 or 3 wherein the length and width of the fields correspond approximately to a segment length.

6. The method according claims 1 or 2 or 3, wherein the length of the segments is smaller by a multiple than the width of the corresponding zone of the inking unit.

7. The method according to claims 1 or 2 or 3 comprising calculating the setting values for the individual zone screws with a personal computer.

* * * * *